United States Patent [19]

(12) United States Patent
Chopard et al.

(10) Patent No.: US 11,858,431 B2
(45) Date of Patent: Jan. 2, 2024

(54) 3D THERMOFORMED ELEMENT

(71) Applicant: Hutchinson, Paris (FR)

(72) Inventors: Fabrice Chopard, Saint-Martin-d'Hères (FR); Cedric Huillet, Montargis (FR)

(73) Assignee: Hutchinson, Paris (FR)

( * ) Notice: Subject to any disclaimer, the term of this patent is extended or adjusted under 35 U.S.C. 154(b) by 356 days.

(21) Appl. No.: 17/269,902

(22) PCT Filed: Aug. 22, 2019

(86) PCT No.: PCT/FR2019/051948
§ 371 (c)(1),
(2) Date: Feb. 19, 2021

(87) PCT Pub. No.: WO2020/039147
PCT Pub. Date: Feb. 27, 2020

(65) Prior Publication Data
US 2021/0323215 A1    Oct. 21, 2021

(30) Foreign Application Priority Data
Aug. 22, 2018  (FR) ...................................... 1857600

(51) Int. Cl.
*B60R 13/00*       (2006.01)
*B60R 13/08*       (2006.01)
(Continued)

(52) U.S. Cl.
CPC ........ *B60R 13/0815* (2013.01); *B29C 51/006* (2013.01); *B29C 51/082* (2013.01); *B29C 51/145* (2013.01); *B60K 1/04* (2013.01); *B62D 25/04* (2013.01); *B64C 1/066* (2013.01); *B64C 1/40* (2013.01); *B29C 51/002* (2013.01); *B29C 2791/006* (2013.01); *B29K 2105/04* (2013.01); *B29K 2995/0002* (2013.01);
(Continued)

(58) Field of Classification Search
None
See application file for complete search history.

(56) References Cited

U.S. PATENT DOCUMENTS 4,035,215 A      7/1977  Goldstone
5,164,254 A  *  11/1992  Todd ...................... B32B 38/08
                                                      156/308.2
(Continued)

FOREIGN PATENT DOCUMENTS

DE           103 24 735 B3    11/2004
DE    10 2011 116 457 A1     4/2013
(Continued)

*Primary Examiner* — Alexander S Thomas
(74) *Attorney, Agent, or Firm* — Blank Rome LLP (57) ABSTRACT

A three-dimensional vacuum thermal insulation element having a compressed three-dimensional porous structure and a shell closed in an airtight manner. The shell includes a thermoformable barrier wall and encloses the porous structure arranged between two major surfaces of said barrier wall. The porous structure has a pressure of between less than 105 Pa and more than 10-2 Pa at ambient external temperature and pressure. The barrier wall is thermoformed at the site of said two major surfaces, between which the porous structure has a curved shape and/or reliefs and/or depressions.

4 Claims, 9 Drawing Sheets

(51) Int. Cl.
*B29C 51/08* (2006.01)
*B29C 51/14* (2006.01)
*B60K 1/04* (2019.01)
*B62D 25/04* (2006.01)
*B64C 1/06* (2006.01)
*B64C 1/40* (2006.01)
*B29C 51/00* (2006.01)
*B29K 105/04* (2006.01)
*B29L 31/30* (2006.01)

(52) U.S. Cl.
CPC ............. *B29K 2995/0015* (2013.01); *B29K 2995/0063* (2013.01); *B29L 2031/3011* (2013.01); *B29L 2031/3014* (2013.01); *B29L 2031/3055* (2013.01); *B29L 2031/3082* (2013.01); *Y10T 428/231* (2015.01); *Y10T 428/237* (2015.01); *Y10T 428/2457* (2015.01); *Y10T 428/24479* (2015.01); *Y10T 428/24992* (2015.01)

(56) References Cited

U.S. PATENT DOCUMENTS

| | | | |
|---|---|---|---|
| 2003/0124314 A1* | 7/2003 | Michael | B32B 3/28 428/141 |
| 2020/0292248 A1 | 9/2020 | Chopard et al. | |

FOREIGN PATENT DOCUMENTS

| | | | | |
|---|---|---|---|---|
| DE | 21 2014 000 217 U1 | 8/2016 | | |
| EP | 2 903 800 A1 | 8/2015 | | |
| JP | H07 187008 A | 7/1995 | | |
| JP | 2000-97390 A | 4/2000 | | |
| JP | 2007-283989 A | 11/2007 | | |
| JP | 2008-202709 A | 9/2008 | | |
| WO | WO-03042444 A2 * | 5/2003 | ........... | B60J 5/0418 |
| WO | WO 2014/053505 A1 | 4/2014 | | |
| WO | WO 2017/029462 A1 | 2/2017 | | |
| WO | WO 2017/153693 A1 | 9/2017 | | |

\* cited by examiner

3D THERMOFORMED ELEMENT

CROSS-REFERENCE TO RELATED APPLICATIONS

This application is a national stage entry of International Application No. PCT/FR2019/051948, filed Aug. 22, 2019, which claims the benefit of French Patent Application No. 1857600, filed Aug. 22, 2018, the contents of each of which are incorporated by reference herein in their entirety.

The present invention concerns a three-dimensional thermoformed element.

Many lining members, typically an inner lining, as in a vehicle, such as an aircraft, train, ship or automobile, are already used for protection purposes, typically thermal and/or acoustic protection, or as a fire barrier element.

For this type of elements, which are typically molded, problems still exist both in terms of structural realization and conditions of use. For example, there are elements with compounds in powder and/or porous form, which pose problems of dispersion and/or handling. Structural problems may also arise, for example, in the context of compromises to be made between requirements for protection (e.g. thermal and/or acoustic and/or fire barrier as mentioned above) on the one hand and volume and/or weight on the other, especially when mounting in cramped and/or difficult-to-access locations. Special shape requirements may also be established.

For example, in an automobile, the floor and walls connecting the passenger compartment to the boot space and the passenger compartment to the engine space are lined with insulating molded parts. These molded parts must be adapted to chassis parts that are sometimes complex, irregular in mechanical strength and/or protective capacity.

Some three-dimensional molded parts, e.g. for sound insulation, may be produced from PU foam (polyurethane). However, this is relatively expensive. In addition, PU foam is also difficult to recycle. Molded parts made from conventional fiber mats, which are manufactured from fibrous material by rollers, are only suitable to a limited degree. Fiber mats may only be used for slightly deformed parts. In addition, due to the lamination method, they do not have a uniform density distribution. Consequently, they often do not meet the geometric and acoustic requirements imposed on these special molded parts.

Within this framework, and in order to provide an adaptable solution for different demanding environments, a three-dimensional thermal insulation element is offered here, the element comprising:
- a compressed three-dimensional porous (porous material) structure,
- an airtightly-closed envelope:
  - comprising a thermoformable and airtight gas barrier member,
  - in which envelope is enclosed the porous structure whose barrier wall follows the shape, and
  - in which enclosure, at outside ambient temperature and pressure, a pressure between less than $10^5$ Pa and more than $10^{-2}$ Pa prevails, characterized in that the barrier wall is thermoformed and the porous structure, which is three-dimensional, is bent-shaped and/or has reliefs (also called protrusions in English) and/or depressions (also called recesses in English) forming a 3D shape.

Thus, the thermoformed barrier wall will have a double effect: that of increasing the thermal protection of the said element, due to the depression created in the envelope, and that of mechanically maintaining the 3D shape.

In fact, the porous structure will be interposed between two major surfaces of the said barrier wall. "Major surface" is to be understood in connection with "minor (or marginal) surface", which is the area where the sheets (or portions of sheets) forming the barrier wall are inter-bonded and where they are sealed together to close the envelope. Complementarily, the two "major surfaces" together form the zone (the larger: major) of the envelope bounded by this sealing zone and which forms the active (thermally insulating) part of the envelope.

"Porous" means a material (or structure) with interstices that allow the passage of air. Porous, open-cell materials therefore include foams but also fibrous materials (such as glass or rock wool). The passage interstices, which may be described as pores, have sizes smaller than 1 or 2 mm so that good thermal insulation may be guaranteed, and preferably smaller than 10 microns.

The porous structure may include or be made of polymeric, mineral or natural fibers. The term fibres is to be understood in a conventional way. These are elongated elements with a length L (which corresponds to its largest dimension) and, transverse to this length, a section where the fibre has a main dimension d (such as a width or a diameter), with a ratio such as $L \geq 5d$, and preferably $L \geq 10d$.

The porous structure could be of a textile nature, which would provide a structuring effect, resulting in a fairly light element and of shapes that may be very varied.

The thermoformable barrier wall may be similar to a film, with a thickness between 50 and 200 microns. But it may be thicker.

According to the conventional definition, the envelope will then be a flexible object whose shape (like its material: the film) and the shape of the porous structure it surrounds will adapt to each other. A synonym would then be: bag or pocket.

Of course, the envelope surrounds the porous structure by covering it completely.

To maintain its shape, once deformed, the three-dimensional porous structure (therefore not flat) may or may not contain a binder (chemical implication).

With a porous structure devoid of chemical binder, the thermal insulating element will favorably present a maximum thickness less than or equal to 20 mm:
- the density of the porous structure shall be between 10 kg/m$^3$ and 300 kg/m$^3$, and between 60 kg/m$^3$ and 150 kg/m$^3$, and
- the thermoformed barrier wall will have a tensile strength and, on all sides of the porous structure, a non-planar shape (bent-shaped form and/or having reliefs and/or depressions) which will impose the shape of the porous structure, so that the thermoformed envelope will maintain the shape of the porous structure.

The combination in particular between a film as mentioned above and the porous structure will make it possible both to achieve and to maintain over time a 3D shape that is both light, with interesting thermal and/or acoustic characteristics, and even mechanically solid, depending on the density or densities of the porous structure retained.

In particular with a thermoformable barrier wall such as a film, it is recommended that the thermoformed wall has a tensile strength greater than 1 MPa, and preferably between 10 MPa and 300 MPa.

Thus, especially in the absence of a binder, the wall will be able to impose on the porous structure the expected 3D shape, forcing it to deform from its initial raw shape, typically a 2D shape.

In particular with a porous structure comprising or consisting of fibers, and to complete the compromise between lightness/structuring/ease of fabrication/functionalization(s) possible within the envelope, it is however also proposed that the porous structure may include a binder, so that, in the case of fibers, a matrix is formed where said fibers will be bonded together at their contact or crossing areas. However, this is not mandatory. Both hypotheses are discussed in more detail below.

If present, and for the same purpose as above, the binder will preferably comprise a glue and/or adhesive.

In addition, such an element will easily lend itself to targeted functional applications, especially due to the structuring provided by the porous structure.

Therefore, it is proposed that said thermoformed element may additionally comprise, in the envelope, a thermal insulator, so that at ambient temperature and pressure, the thermoformed element has, through the barrier wall, a coefficient of thermal conductivity ($\lambda$) lower than 30 mW/m·K.

In the application, ambient temperature and pressure mean 20° C. and $10^5$ Pa, respectively, +/−10%.

In particular, with the solution developed here, it will be possible for the thermal insulation (such as an aerogel) to be arranged in the envelope, in the porous structure. This makes it easier to obtain the thermoformed element and limits its cost, while allowing very varied shapes and various protective effects, depending on the density and/or thickness of the porous structure retained. The binder will then be able to freeze and hold the thermal insulation in place.

In the same context, it may be appropriate to include (at least) a phase change material (PCM) in the envelope.

The combined use of a porous structure and dispersed particles for the PCM(s) and/or the thermal insulation will make it possible to obtain, in an industrially feasible way in series, a variable concentration of these components that the binder will fix and unite.

With a porous structure as above, and whether or not there is thermal insulation and/or MCP, the said element will favorably present, +/−5%, a thickness between 0.8 and 20 mm, and a density between 5 and 350 Kg/m$^3$.

Preferably, the pore volume (void space) will be between 80 and 99% (volume percent).

With or without binder, another aspect provides that the invention allows the said element to be adapted to its operational environment, and in particular to obtain:
that said thermoformed element has first zones with a first thickness and second zones with a second thickness less than the first thickness,
and that the second zones have a higher density of porous material than the density of porous material of the first zones.

Thus, the thermal conductivity and/or the mechanical strength may be easily varied in the direction of thickness, albeit to a limited extent, but without necessarily having to add fillers in the textile structure (MCP or thermal insulating material such as aerogel; see below).

Also concerned is an assembly in a vehicle, the assembly including:
a structural element (or structural member) interposed between an external environment of an interior volume of the vehicle, to be thermally and/or acoustically protected, and
an inner lining member lining the structural element, the inner lining member comprising at least one said thermal insulating element having all or part of the above characteristics, with, in the envelope:
one or more priority areas where a thermal exchange to be controlled between the external environment and said internal volume has been identified,
and/or zone(s) of lesser thickness,
and/or attachment area(s), where said thermal insulating element is attached to the structure,
and/or a charge of a phase change material (PCM),
and/or a charge of a thermal insulator, where the said preferred thermal exchange zone(s) is/are located,
and/or an overdensity of porous material compared to other areas of porous material, where the attachment area(s) is located and/or where the preferred area(s) is located, and/or where the area(s) of lesser thickness is located.

An assembly (e.g. in a vehicle) is further concerned, the assembly including:
a three-dimensional structural element, having a curved shape (also called bent-shaped form) and/or reliefs and/or depressions interposed between an external environment of an interior volume of the vehicle, to be thermally and/or acoustically protected, and
an inner lining member of the structural element, the inner lining member comprising at least one said thermal insulating element having all or part of the above characteristics and which is thus interposed between the external environment and the internal volume of the vehicle to be protected, the bent-shaped form (in other words: the bending) and/or the local depressions and/or reliefs of the said thermal insulating element being engaged at least partly with the curved shape (or said bent-shaped form) and/or the reliefs and/or the depressions of the structural element, in order to substantially follow at least part of its contour.

In particular, to thermally manage a vehicle battery pack (electric accumulators), it is also proposed:
whether the structural element is a part of the vehicle body or an attached protective plate,
that the inner lining member is thus interposed between the external environment and a cooling plate of a battery pack for the electrical supply of the vehicle disposed in the interior volume, which vehicle is of the hybrid or all-electric type, said at least one thermal insulating element being sandwiched between the protective plate and the cooling plate, which comprises channels for the circulation of a cooling fluid disposed in thermal exchange with the battery pack.

And, to ensure an efficient compromise between the said thermal management of this battery pack and the mechanical constraints (protection and resistance) and available space, it is further proposed:
that the cooling plate has reliefs and depressions, at least some of which are defined by the cooling fluid circulation channels,
that the structural element has said reliefs and depressions,
that said thermal insulating element also has said reliefs and depressions (on both major surfaces of the barrier wall), and,
(on the said major surfaces of this barrier wall:)
said respective reliefs of the thermal insulating element will then be engaged with the respective depressions of the cooling plate and the structural element, and the respective depressions of this thermal insulating element will be engaged with the respective reliefs of the cooling plate and the structural element.

Two other situations were also explored:

a) that of a said assembly in which:
the aforementioned structural element comprises a part of a body of a vehicle surrounding a passenger compartment (61) of the vehicle, and
the assembly further comprises, between the structural element and the said at least one thermal insulating element:
either a layer of air and another part of the structural element,
either a layer of air at least 20 mm thick and a first layer of insulation material;

b) that of a said assembly in which the structural element is a body part of a vehicle comprising:
outer panels referenced (63,77 below) belonging to a fuselage (75 below) or a body (60 below) and, attached to them internally,
frames and/or rails and/or stringers, which are individually surrounded by at least one said thermal insulating element.

In this way, the insulation is "glued" as closely as possible to the area to be insulated and the weight and thickness are limited.

A layer of air of at least 20 mm (see quickly 40 or 60 mm) will make it possible to secure the thermal aspect and to pass cables, conduits . . . etc, in particular in a commercial airliner, by adapting if necessary at least equal to 20 mm at best the shapes.

It should be noted that the expression "inner lining member" (which could also have been called "inner lining member") has the meaning:
element located radially inside the structural element, and the lining member, or,
element located inside a volume, or a depression (or hollow), of the structural element, while lining this element.

Also concerned is a process for manufacturing a three-dimensional thermal insulating element in a vacuum, in which process:
(a) at least one compressed porous structure is used,
(b) said porous structure is arranged in an envelope having an airtight barrier wall, the porous structure being interposed between two major surfaces of the said barrier wall, then, by contact between two minor surfaces of the said barrier wall, the envelope (in which a reduced pressure of between less than $10^5$ Pa and more than $10^{-2}$ Pa has been established) is closed with an airtight sealing,
wherein:
c) after the airtight sealing of the envelope, the porous structure is given a three-dimensional bent-shaped and/or three-dimensional reliefs and/or depressions, by pressing the envelope against a mold which provides a deformation of the barrier wall and the porous structure.

This combines the ability to create a fine thermal insulating element (compressed porous structure) in a vacuum and in three dimensions. Not carrying out steps b) and c) in any other sequence allows the vacuum to be exploited. The vacuum increases the mechanical structuring of the element, in particular the porous structure, which then favors the 3D deformation. If necessary, the barrier wall may be a metal wall of a few tenths of mm thickness (e.g. aluminum or steel).

The invention will if necessary be better understood and other details, characteristics and advantages of the invention may appear when reading the following description made as a non-limiting example with reference to the annexed drawings in which:

FIGS. 18-19 schematize another application variant.

Figure 1:
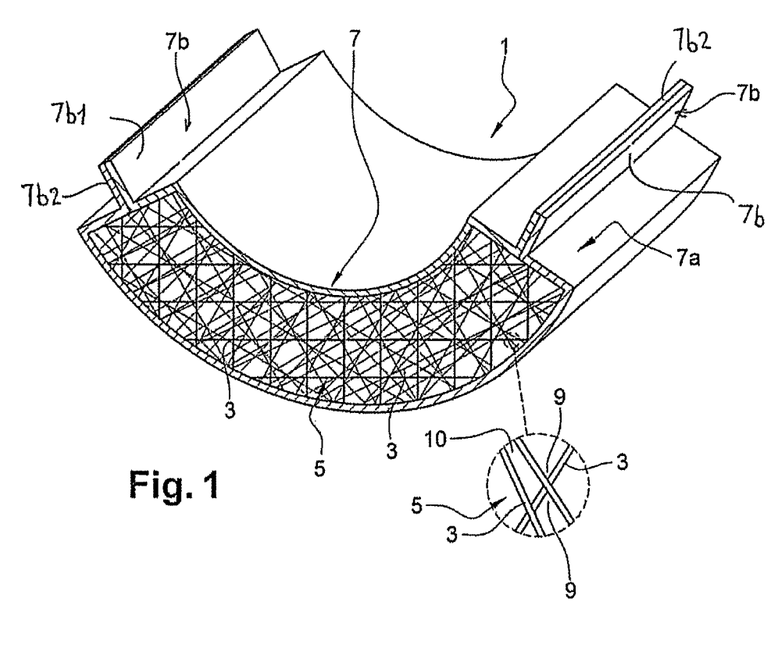
FIG. 1 is a sectional view of a section of a part corresponding to the above-mentioned element according to the invention, this view being completed by a local enlargement.

We have thus represented, in FIG. 1, a three-dimensional thermoformed set 1, of the PIV (vacuum insulation panel) type.

This set includes:
a porous structure 5 in three dimensions, and
an external envelope 7 comprising (or consisting of) a wall 7*a*.

It is to be understood that the expression "in three dimensions" (3D) is equivalent, as in the common sense, to not (integrally) plane. The thermoformed set 1, like thus the fibrous textile structure 5, is represented bent-shaped; but they may also present local corresponding reliefs and/or depressions, as for example in zones respectively 25, 27 in FIG. 7, or in FIGS. 5,6 (zones 21,23). These depressions and reliefs may be defined as embossings.

Figure 11:
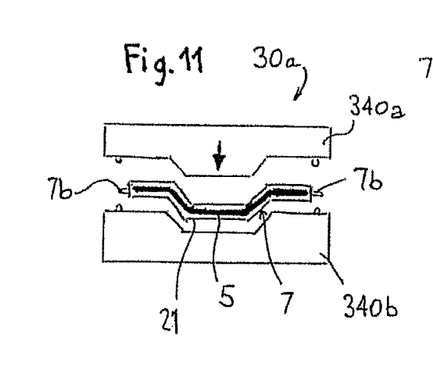
Figures 12, 13:
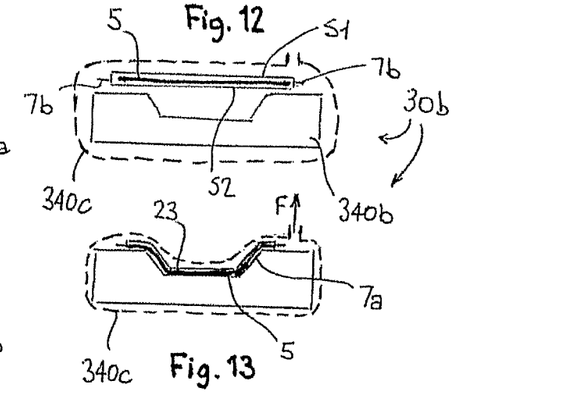

The porous structure 5 will be advantageously based on powder or a fibrous textile structure and thus will include fibers 3 which are polymeric, mineral (glass, basalt for example) or natural (cellulose, flax, hemp for example). The fibrous textile structure 5 is then a woven or non-woven fabric. A felt will be interesting for its intrinsic compression (felt is a compressed, non-woven structure obtained by pressing and agglutinating fibers). In addition to this intrinsic compression, the felt would advantageously be compressed later in the shaping mold (30a or 30b below; FIGS. 11-13). An aerogel is also possible, but if compression of the porous structure is not in its favour. Avoid using a foam that loses its thermal insulation quality after a certain degree of compression.

Felt, or more generally the fibrous textile structure 5, may be presented as a slab (see FIG. 8: e<<L) or a block (e<l<L). The shape will typically be 2D (flat). A chemical binder is not required (solution of FIG. 8).

Wall 7a is thermoformable, in the sense that it then comprises a polymer film that has been thermoformed: polymer alone or metal lined, such as a complex or composite film: metallized PET film where PET has been sprayed with aluminum.

Figure 3:
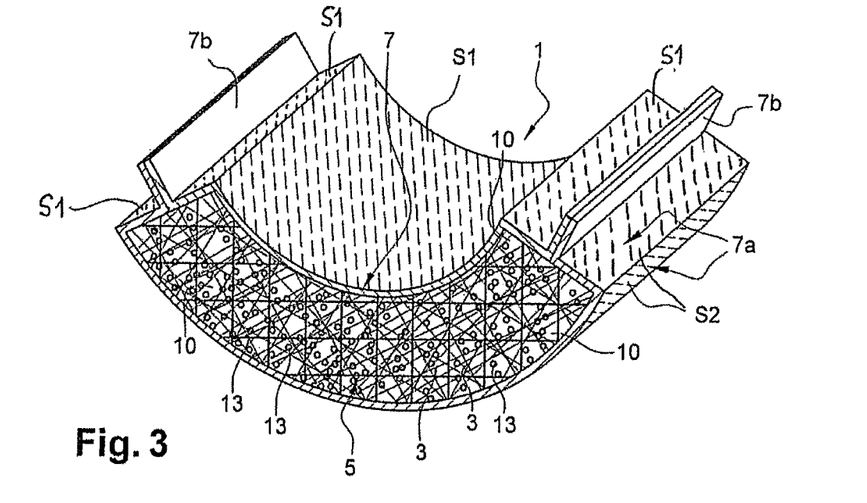
FIG. 3 corresponds to the cut section of FIG. 1, this time with the addition of MCP particles in the porous structure.
Figure 6:
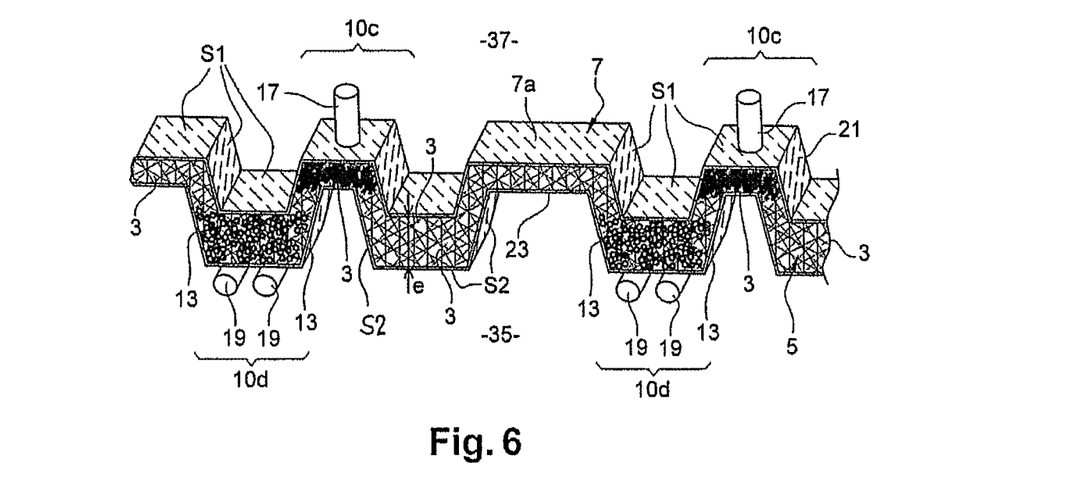

The polymer film (alone or thus metal-backed) 7a will have been thermoformed at the location of the two major (or main) surfaces, S1 and S2 FIG. 3 or 6 (surfaces opposite each other, in dashed lines), between which the fibrous textile structure 5, which is three-dimensional, is bent-shaped and/or has reliefs 21 and/or depressions 23. This thermoforming of the polymeric film 7a will thus not have been limited, as in a 2D flat piece, to the minor/marginal peripheral zone in terms of surface area (zones 7b FIGS. 1, 3 since these are sections) where there is inter-bonding of the sheets forming the wall 7a and where these sheets are sealed together, typically heat-welded, to close the envelope.

Envelope 7 contains in a closed manner the porous structure 5; and its wall 7a follows the shape of this porous structure, where it faces it (major surfaces S1 and S2).

Figures 7, 8:
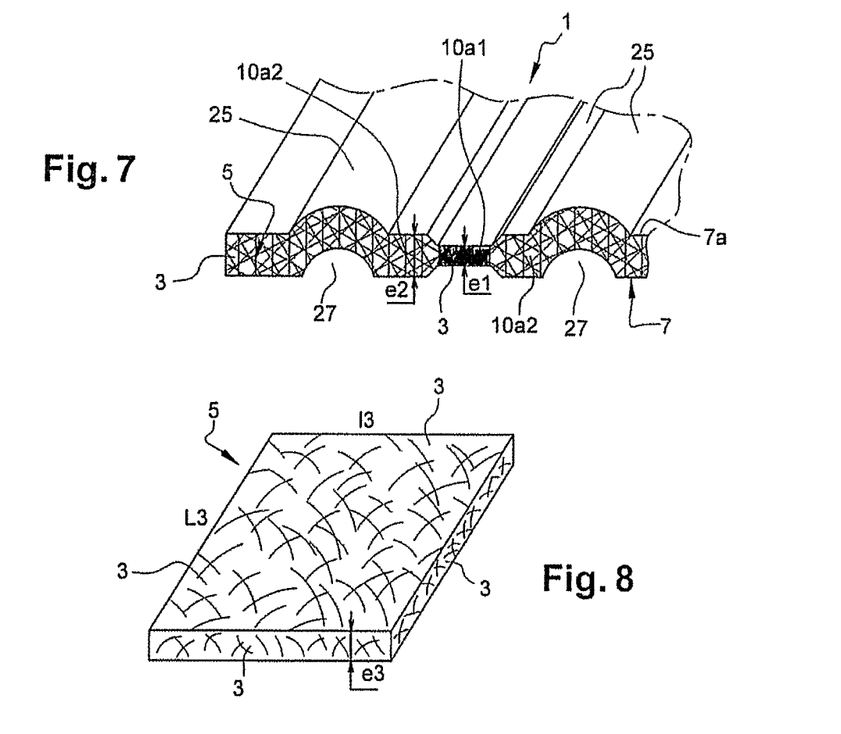

As shown in FIG. 8, the porous structure 5 will look favorably as at least one plate differing from a block in that there is then a ratio of at least five between the thickness e3 and the length (L3) and width (l3).

As mentioned above, the sealing of the wall 7a could have consisted of gluing or welding. This confirms that, in the three-dimensional set 1 formed in three dimensions, the porous structure 5 and the envelope 7 retain, as initially, their respective structural identities. They are not fused together. They remain distinctly identifiable; they are structurally independent of each other: It is possible to cut the envelope 7 and remove it from its position around the fibrous structure 5 without having to tear it off. It is therefore not a coating or surface layer (coating as in U.S. Pat. No. 4,035,215).

If it is a "film", material 7a will have a favorable thickness between 30 and 800 microns, preferably between 50 and 150 microns.

In the hypothesis of a porous structure 5, such as for example fibres 3 without binder (see below and FIG. 8, in a raw form of the product, before wrapping and thermoforming) but joined in a felt, it is recommended that the set 1 has a maximum thickness less than or equal to 20 mm, preferably 8 mm and preferably 3 mm. And if a thermoformed polymer-based film 7a is used, it is recommended that it then has a tensile strength such that the desired integrity of the 3D shape is maintained.

This tensile strength ("tensile strength", often abbreviated as (TS), or "ultimate strength", Ftu) of a typical 7a film, whether in a version after the above-mentioned thermoforming step, or before (state of this film as marketed before its implementation in accordance with the present invention), will be favorably higher than 1 MPa, and preferably between 10 MPa and 300 MPa and even more preferably between 50 MPa and 100 MPa.

If these characteristics are not respected, the relatively free character of the porous structure 5 and the mechanical resistance of the envelope 7, whose thermoforming will thus have fixed a common "3D" shape by constraint of the said structure and softening of the film 7a, will not be able to ensure that the thermoformed assembly 1 maintains its 3D shape over time:

following the relaxation of stress of the porous structure after thermoforming, and the wrapping film will not be able to prevent this.

Hence a possible preference for a slightly thicker metal 7a wall.

As will also be seen in connection with FIG. 6, it is also possible with such characteristics to obtain that the assembly 1 has first zones 10a1 with a first thickness e1 and second zones 10b1 with a second thickness e2 greater than the first thickness e1 (e1<e2), the first zones 10a1 having a higher pore structure density 5 than the second zones 10b1; see FIG. 7, where, if the maximum thickness is assumed to be e2, e2≤58 mm and preferably e2≤3 mm are shown.

If the porous structure 5 is free of binder 9, the respective densities of porous material 3 in the first zones 10a1 and second zones 10b1 will each be uniform (equal) throughout the respective thicknesses e1, e2. These density variations between zones such as 10a1, 10b1 may be achieved by starting from different thicknesses of these zones from each other (e1+X and e2+X respectively). The globally uniform compression on the outer surface of the porous structure 5, created during the thermoforming of the barrier wall 7a, will allow the above-mentioned thicknesses, e1 and e2 respectively, to be achieved.

As a second hypothesis, it is therefore possible that a chemical binder is present in the porous structure 5. Once compressed/formed in 3D, the porous material 3 will then keep this state by itself. The manufacturing technique may be that of EP-A-2903800, a fibrous structure and a manufacturing process are known from the documents DE 103 24 735. Epoxy or phenolic resin may be used as binder 9.

In this case, it may be assumed that the formed unit 1 has a maximum thickness e,e2,e3 of more than 3 mm. Binder 9 is used both to shape the porous structure 5 (during thermoforming) and to maintain its shape integrity over time.

When using a heat-reactive binder 9, such as polypropylene or phenolic resin, the porous material should be heated so that the porous material melts and a rigid, non-deformable molded part is formed.

With or without binder 9, the forming of set 1 may take place in a forming mold 30a or 30b (FIGS. 11-13):

a) the material of the raw structure 5, in a priori 2D form (plate or block in particular; in one or more pieces) and in a compressed state (as is for example a felt), is first interposed between two major surfaces S1,S2 of the said barrier wall 7a, as shown in FIG. 12, b) then, by contact between the two minor (peripheral) surfaces 7b1,7b2 (cf. FIG. 1, thus smaller surfaces than the major surfaces mentioned above and which together form the said minor/marginal peripheral surface or zone) of this wall 7a, the envelope 7 is sealed airtight, c) and a reduced pressure is established between less than $10^5$ Pa and more than $10^{-2}$ Pa, d) furthermore, once the envelope 7 is closed, the porous structure 5 is given the expected three-dimensional shape: bent-shaped and/or with reliefs 21 and/or depressions 23, by pressing the envelope against said mold, thus creating a deformation of the barrier wall 7a and the porous structure 5.

Although an exclusively metallic 7a wall of a few tenths of a mm thickness may be suitable, it may be preferable, in step a), to choose a thermoformable wall and then, in step d), to heat this wall so that the two heated major surfaces S1,S2 soften. This ductility is then used to shape the wall 7*a* and the material of structure 5 under pressure by means of casting, after which it is allowed to cool.

If the polymer film 7*a* option is chosen, it may be a polyimide or PEEK film, or polyethylene, or polypropylene.

In step d), the molding may include a casting between a male element 340*a* and a female element 340*b* of a mold 30*a*, for bending and/or embossing, as shown in FIG. 11.

However, to facilitate the making of the shapes, it may be proposed a deformation by pressure against a mold 30*b* including:
- a molding between:
    - a male element or female element, both for bending and/or embossing, 340*a* or 340*b*, from which a first of said two major surfaces S1,S2 is approached, and
    - a deformable membrane 340*c* which, by depression (arrow F FIG. 13), will be applied against the second of said two major surfaces S1,S2,
- and a heating, up to the thermoforming temperature of the polymer barrier film 7*a*, this until the porous structure 5, interposed between the male element or female element and the membrane 340*c* (which will substantially conform to the shape), be given a three-dimensional shape, bent-shaped and/or having the aforementioned reliefs and/or depressions, as shown in FIG. 13.

The deformable membrane 340*c* may be made of flexible plastic or rubber-based material that may withstand a temperature of 140 to 200° C.

Figure 2:
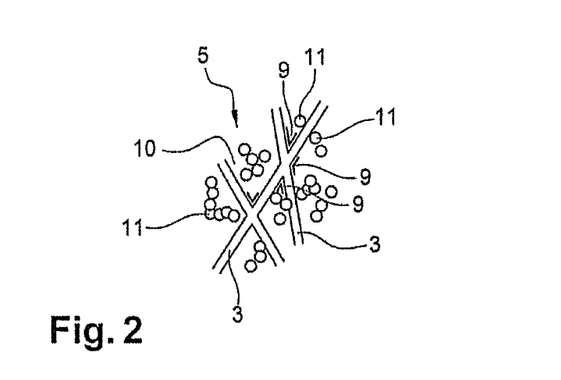
FIG. 2 corresponds to the local enlargement of FIG. 1, with, however, the addition of thermal insulation in the porous structure.

At least one thermal insulator 11 may be usefully added to the above assembly 1, in the envelope 7, so that at ambient temperature and pressure, assembly 1 presents, through the film 7*a*, a coefficient of thermal conductivity ($\lambda$) lower than 40 mW/m·K, and preferably lower than 20 mW/m·K; see FIG. 2.

In addition, with the protective wall 7*a*, the thermal insulation 11 may then be usefully dispersed in structure 5.

With particles as material of the thermal insulation 11, a variable concentration may be achieved at different locations.

This is also possible if at least one phase-change material (PCM) is also present in the envelope 7, which may be dispersed in structure 5 (FIG. 3).

Figure 4:
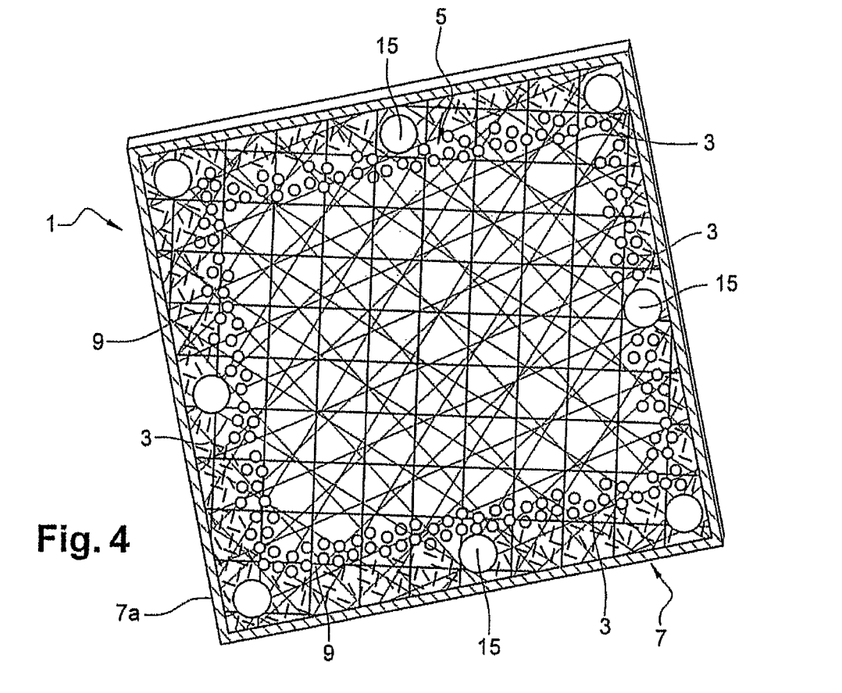
FIG. 4 is also a planar section of a part corresponding to the above-mentioned element according to the invention, with over-densification in the porous structure at the periphery, likewise for the sections of FIGS. 5 and 6, where the element illustrated, according to the invention, is however either provided with local over-densification in heat insulation particles (FIG. 5) and PCM particles (FIG. 6), respectively, the identical section of FIG. 7 corresponding to a porous structure without binder, FIG. 8 schematizes an example of a rough porous structure, in a hypothesis without binder, as used when it is placed in the shaping mold, FIG. 9 schematizes an application to an automobile door, and, FIG. 10 shows an exploded diagram of a battery insulation solution, with nested shapes, thus saving heat and space, FIGS. 11, then 12,13 schematize two molds for manufacturing a thermoformed assembly in three dimensions, and FIG. 14 schematizes an assembly (in section) with reinforced thermal and acoustic capacities, with double pocket, one inside the other, and double thickness of insulation, FIGS. 15-17 schematize a variant application.
Figure 5:
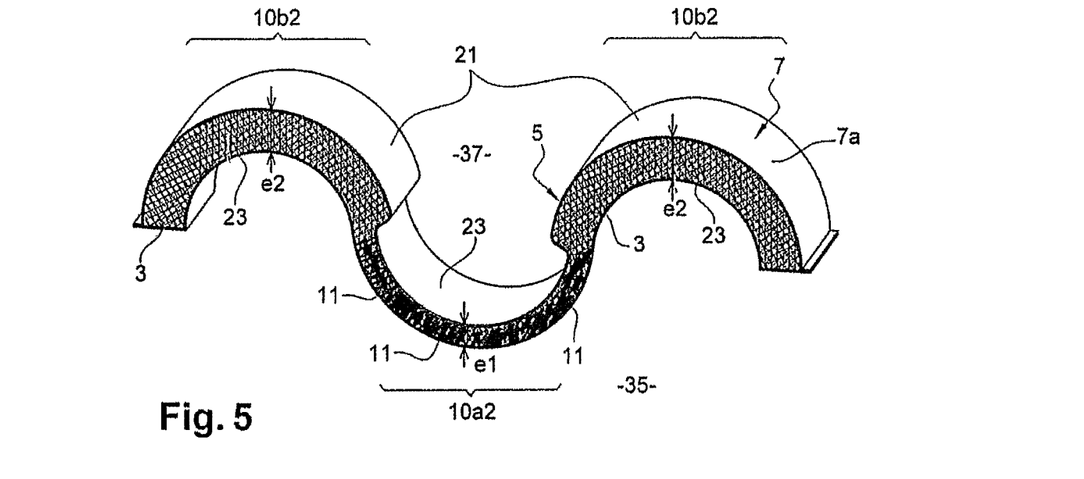

FIGS. 4-6 show preferred operational examples of variable densification/dispersions of material 3 and particles 11 and/or 13, in the porous structure 5, under the envelope 7.

In the example in FIG. 4, structure 5 includes, peripherally, overdensification or overconcentration e.g. in fibres 3 and (particles of) MCP 13. The overdensification in material 3 is located around the attachment areas of part 1 corresponding to the through-passages (circles), some of which are referenced 15. This overdensification may result from an initial dosing, e.g. of fibers, which is higher in some areas than in others. It may also result from a higher compression in some areas than in others.

In the example in FIG. 5, structure 5 of part 1 is thinner in part 10*a*2 (thickness e1) than it is in part(s) 10*b*2 (thickness e2). It is in part 10*a*2 finer that there is over-densification or over-concentration in (particles of) thermal insulation 11, to compensate for the lesser thickness and maintain homogeneous thermal conductivity.

In the example shown in FIG. 6, the porous structure 5 of part 1 is overloaded with material 3 (e.g. increased fiber density) in zones 10*c*, where the part may be fixed, e.g. by means of rods 17, and where the part has corners, i.e. areas of potential mechanical weakness. Like zones 15, zones 10*c* define integrated zones of reinforcement or mechanical structuring, without the need for external reinforcement.

In zone(s) 10*d* the structure 5 is (over)loaded with MCP 13, where part 1 has one or more thermal exchange zone(s) with a refrigerant or heat transfer fluid 19. Thus, the areas of (over)densification or (over)concentration of particles and/or fibres may be precisely and appropriately located where required.

As already mentioned, a notable field of application of the invention is that of vehicles. The three-dimensional assembly formed 1 may in particular define there an internal lining member of a structural element, said structural element separating between them an external environment and an internal volume to be insulated or thermally and/or acoustically protected from this external environment, this with constraints of exiguous volume, particular shapes and/or weight to be limited as much as possible.

Figure 9:
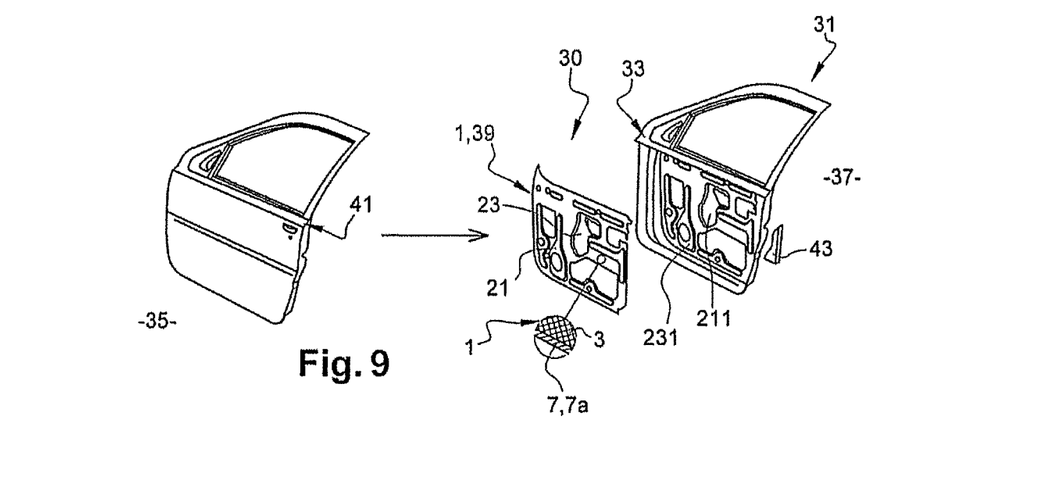

Thus one may see FIG. 9 an example of assembly 30, in a vehicle 31 (here an automobile, but it could be an aircraft, in particular an aircraft cabin). This assembly includes:
- a structural element 33 interposed between an external environment (EXT;35) of an internal volume (INT;37) of the vehicle, this internal volume (typically the passenger compartment of the vehicle) being to be thermally and/or acoustically protected from the external environment 35, and
- an inner lining member 39 for lining the structural element 33, the inner lining member comprising the set as 1 above.

The lining member 39 is thus interposed between volumes 35 and 37.

The structural element 33 may be a door panel, made of metal, of composite (i.e. composed of several materials; for example a mixture of synthetic resin and mineral, natural or synthetic fibres) or of plastic. It defines in the example the structural frame of a car door. At the exterior side, a door panel metal sheet 41 may be attached to it, for defining the exterior body of the door. At the interior side (passenger side), an interior trim panel 43 may be attached to it, so that assembly 1 is interposed between the metal sheet 41 and the interior trim panel 43.

The bent-shaped form (or bending) and/or reliefs 21 and/or depressions 23 of structural element 1 are engaged at least in part with the complementary curved shape and/or recessed shape 231 and/or reliefs 211 of the structural element 33, so that they respectively substantially conform to at least part of the contour thereof; see FIG. 9.

In the totally closed envelope 7 of this set 1 may be found, as shown in FIGS. 5,6 (which may be considered as two respective cuts, in the direction of thickness, at two different places of the surface defined by set 1, see hatching FIG. 9):
- at least one priority area 10*d* where a thermal exchange to be controlled between the external environment 35 and the internal volume 37 has been identified,
- and/or at least one zone (10*a*) of lesser thickness (e1),
- and/or attachment zone(s) 10*c*, where assembly 1 is attached to structure 33.

These attachments to structural element 33 may include screwing, riveting or other fasteners, for example, via rods 17.

And the envelope 7 will then also contain at least one of:
- a filler of (particles of) a phase change material 13 (PCM) and/or a filler of (particles of) a thermal insulator 11, where the said preferred thermal exchange zone(s) 10*d* is/are located,
- and/or an overload of material 3, where the attachment zone(s) is located and/or where the zone(s) of lesser thickness (e1) is located.

Rather than, as shown in FIG. 6, where a filler of (particles of) MCP 13 is therefore found in the envelope 7 where part 1 has one or more thermal exchange zone(s) with a refrigerant or heat transfer medium 19, a filler or overfill with thermal insulation 11 (such as at least one layer of polyurethane) is preferred here, or polyester fibres dispersed in the porous structure), where the preferred thermal exchange zone(s) 10d is located, i.e. where one or more zones have been identified, in the direction of the thickness (e) of the envelope 7, where the local thermal conductivity coefficient ($\lambda$) is higher than a predefined threshold, between volumes 35 and 37.

Figure 10:
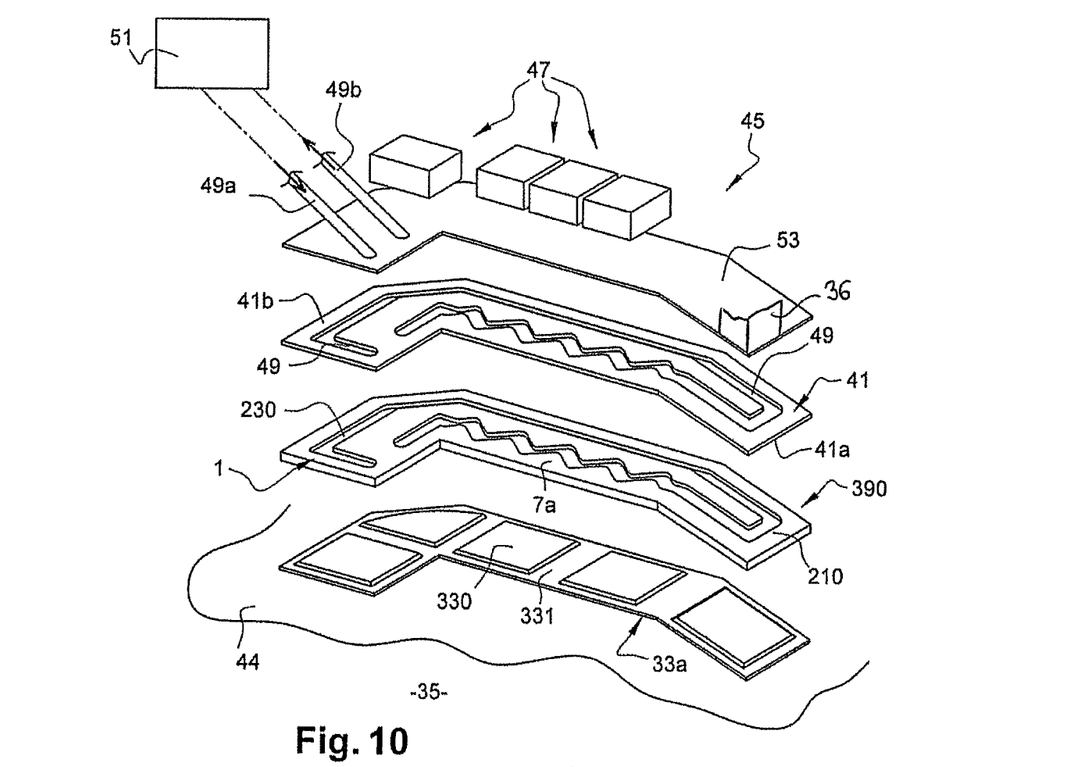

In FIG. 10, another advanced assembly conforming to the invention has been schematized.

The environment is that of part of the body 44 of an all-electric or hybrid motor vehicle 45 or of a protective plate 33a attached to the battery compartment 36 and/or the body 44 of the vehicle (here, body and chassis of the vehicle are confused). An electric battery pack 47 for the electrical supply of the vehicle, contained in the closed compartment 36, is to be installed:
  in the interior volume 37,
  or in the immediate vicinity of it, for example outside just under the box 44, in the said compartment 36, via for example the protective plate 33a which may be fixed to the box, under it, by screwing.

The above-mentioned structural element 33 may therefore be defined by a protective plate 33a. The metal plate 33a extends like a floor (or is a part of it) and provides protection against, for example, scratches. A part of it may be seen in FIG. 10.

The above-mentioned inner lining member 39 e is in the example defined by one or more trays 390 comprising one or more elements 1, with a 3D shape (here partly bent-shaped), interposed between the external environment 35 and a cooling plate 41 of the battery pack 47.

The cooling plate 41 comprises channels 49 for the circulation of a cooling fluid arranged in thermal exchange with the battery pack 47. In communication with a thermal exchanger 51 located further in the vehicle, the coolant flows through channels 49 via an inlet 49a and outlet 49b that communicate with channels 49. The underside of the support plate 53, on which the electric battery pack 47 rests, forms a cover for the channels 49, which rest tightly against it by their edges. In addition or alternatively the support plate 53 may be part of the battery compartment in which the battery pack 47 is enclosed. To form a thermal barrier to the external environment 35, especially for battery pack 47, the (each) thermally insulating element 1 is sandwiched between plate 33a and cooling plate 41.

With its lower side 41a and upper side 41b being the mirror image of each other, plate 41 has reliefs and depressions, at least some of which are defined by channels 49 on the upper side. The protective plate 33a also has reliefs 330 and depressions 331.

And element(s) 1 itself has, as already indicated, said reliefs 210 and depressions 230, here on the two major surfaces (lower and upper) of the thermoformed barrier wall; but these reliefs and depressions are different on the lower and upper faces, since, facing each other, the reliefs and depressions of plate 33a and plate 41 are different from each other, but complementary to those of element(s) 1.

Therefore, on the said major surfaces of the barrier wall (7a):
  the respective reliefs of element(s) 1 are engaged with the respective depressions of plate 41 for cooling and plate 33a for protection,
  and said respective depressions of element(s) 1 are engaged with the respective reliefs of cooling plate 41 and plate 33a.

It must also be understood that the solutions that may be associated between the modes of realization, as well as between the figures, are transferable from one realization to another and may thus be associated between them.

Figure 14:
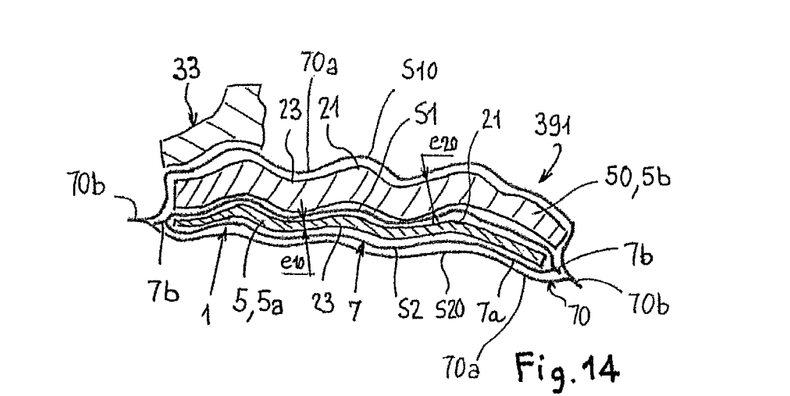

Another efficient aspect has been schematized in FIG. 14. This is a solution where both thermal and acoustic problems may be treated in a refined way.

This solution proposes in fact to obtain a reinforced thermal insulation and a relevant acoustic insulation, by associating:
  with a structural element 33 thus separating an external environment 35 from an internal volume 37 to be thermally and/or acoustically protected,
  an inner lining member 391 of structural element 33, element 391 comprising at least one said thermal insulating element 1.

More precisely, it is first proposed to use the above assembly, with the said at least one thermal insulating element 1 comprising its porous structure 5 in its envelope 7 formed by the barrier wall 7a. This wall 7 is always thermoformed at the location of the said two major surfaces (S1, S2) between which the porous structure 5, which is three-dimensional, thus bent-shaped and/or having reliefs and/or depressions, as shown in the diagram.

However, in this solution it is furthermore provided:
  that this porous structure 5 defines a first porous structure comprising a porous material 5a having a first density,
  that the inner lining member 391 further comprises a second porous structure 50 comprising the same porous material (5a), or a different porous material 5b, having a second density.

The second density is lower than the first density, and the first porous structure 5 is superimposed with the second porous structure 50.

Superimposed here means that we have a double thickness: the cumulative thickness of the porous structures 5.50 between zones 35 and 37.

The superimposition of these structures is not necessarily in a horizontal plane; it may be for example in a vertical plane, as in the example of a car door FIG. 9. It should be noted in this respect that applications other than on a vehicle are possible; in the building for example.

This being said, one should also note:
  that the second porous structure 50 is bent-shaped and/or has reliefs 21 and/or depressions 23, and
  that element 1 thermal insulation and the second porous structure 50 are:
    enclosed together in a second envelope 70 having wall 70a,
    and interposed between two major surfaces S10,S20 of said wall 70a, said wall 70a being thermoformed at the location of said two major surfaces S10,S20.

It will have been understood that the two major surfaces S10,S20 are the image on envelope 70 and its wall 70a of the two major surfaces S1,S2 on envelope 7 and its wall 7a. The minor/marginal peripheral zone in terms of surface, here 70b image of 7b, remains.

The second envelope 70 is not necessarily under vacuum. The second porous structure 50 may be in a third vacuum envelope, itself then housed, with the first envelope 70, in the second envelope 70.

Typically less compressed than the first porous structure 5, the second porous structure 50 will have a thickness e20 greater than the thickness e10 of the first porous structure 5, this being to be considered everywhere or on most of at least the larger of the surfaces of the two porous structures 5,50.

The thickness e20 may be from 3 to 15 mm. The thickness e10 may be from 0.5 to 2.5 mm. The first density may be from more than 100 to 800 kg/m$^3$; the second density may be from 5 to less than 100 kg/m$^3$.

The first porous structure 5 provides relevant thermal and acoustic insulation. The second porous structure 50 ensures a reinforced thermal insulation and a more limited acoustic insulation in low frequencies, but good in high frequencies. We thus obtain a hybrid solution with a heavy assembly (mass effect) that absorbs in low frequencies (20 to 200 Hz) through the first porous structure 5 and in high frequencies (above 200 Hz) through the second porous structure 50.

Several other applications are further presented below, with reference to FIG. 15 and following:

(a) Firstly, the applications relative:
to a part of the vehicle body (30 or 45), such as a roof (or part of the roof) 60, or more generally:
to a structure of limitation of the passenger compartment 61 of a vehicle.

The uprights or the body and their lining in the passenger compartment are therefore concerned.

The term passenger compartment is to be understood as "space receiving occupants to be transported" and an aircraft is a "vehicle"; therefore an aircraft fuselage is also concerned.

Figure 15:
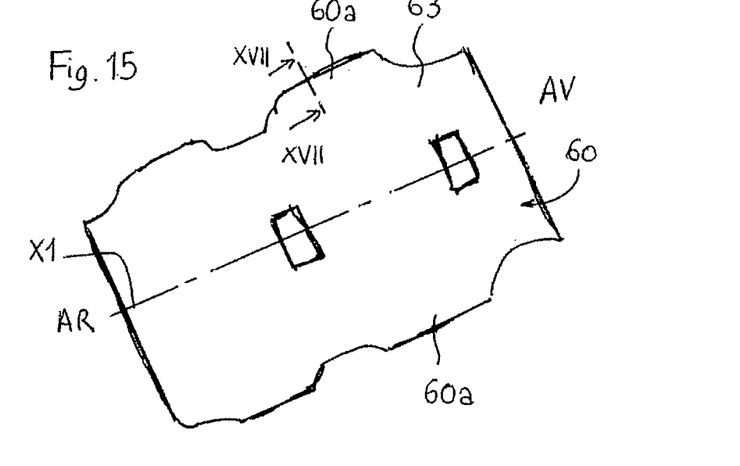
Figure 16:
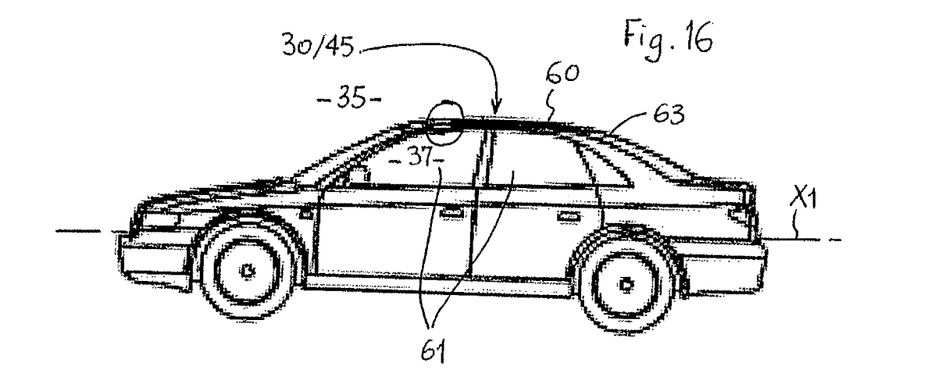
Figure 17:
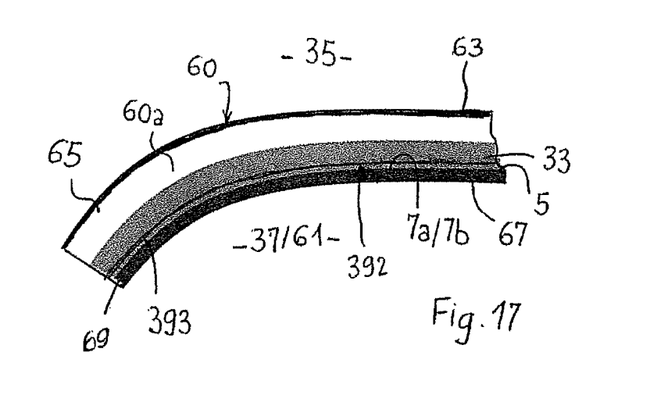
FIG. 17 shows Section XVII-XVII in the circled area of FIG. 16, with local enlargement at the arrowed location.

In the example in FIGS. 15-17, it is a roof angle that is located. The roof (or part of the roof) 60 comprises successively, in the direction of thickness, from the external environment 35 to the internal volume 37 (passenger compartment 61):
the body 63 (which could be the fuselage), a plastic, metal or composite structural part with, in the interior lining:
a layer of air 65 (5 to 15 mm thick; often 8 to 12 mm), then the assembly already presented including:
a structural element 33, as previously interposed between the external environment 35 and the internal volume 37 to be protected,
and a said inner lining member 393 of structural element 33, the inner lining member thus comprising at least one said three-dimensional, vacuum thermal insulating element 1, the thermal insulating element (1) comprising (not illustrated),
the porous three-dimensional compressed structure 5,
the envelope 7 closed in an airtight manner and whose barrier wall 7*a* (and/or 7*b*) is thermoformable,
and a soft lining or liner 67.

Typically, the liner 67 may be a fabric (woven, woven or non-woven yarns) and is lined with a foam layer 69 on the inside, between barrier wall 7*a* and liner 67.

Together, the foam layer 69 and the liner 67 may be of 2 to 5 mm thick, the thermal insulation element 1 of 3 to 6 mm, the structural element 33 of 4 to 10 mm.

The structural element 33 (which may be composite) actually forms a second part of the so-called "structural element", the first part being formed by the outer body 63.

An approximate top view of the roof part 60 of the vehicle, which is lined by the structure shown below, is shown in FIG. 15; the front of the passenger compartment (of the vehicle) is front, the rear is rear; the schematic boundaries are shown in FIG. 15; the thermal insulating element 1 may be in one or more parts to occupy at least most of the surface. The longitudinal axis is X1.

Through the part of the roof 60 (and of the thermal insulating element(s) 1, may be if necessary provided passages 71*a*, 71*b*, for ceiling lights of the front and rear seats respectively.

Following the cross section line XVII-XVII, the roof part 60 is rounded off laterally, in 60*a* (idem on the opposite side, in 60*b*), in particular. Thus, the porous structure 5, which is three-dimensional, is at least bent-shaped, as shown in FIG. 17, with a detail according to for example FIG. 3 or 14.

(b) Next (see FIGS. 18-20), the applications relating to the insulation of an aircraft fuselage 75, insofar as it may be a variant of that of FIGS. 15-17, in the fuselage/aircraft cabin application.

Figure 18:
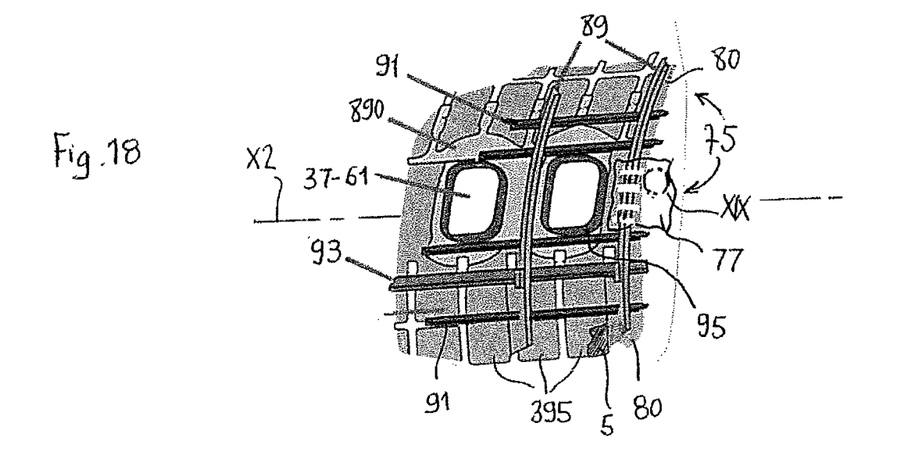
Figure 19:
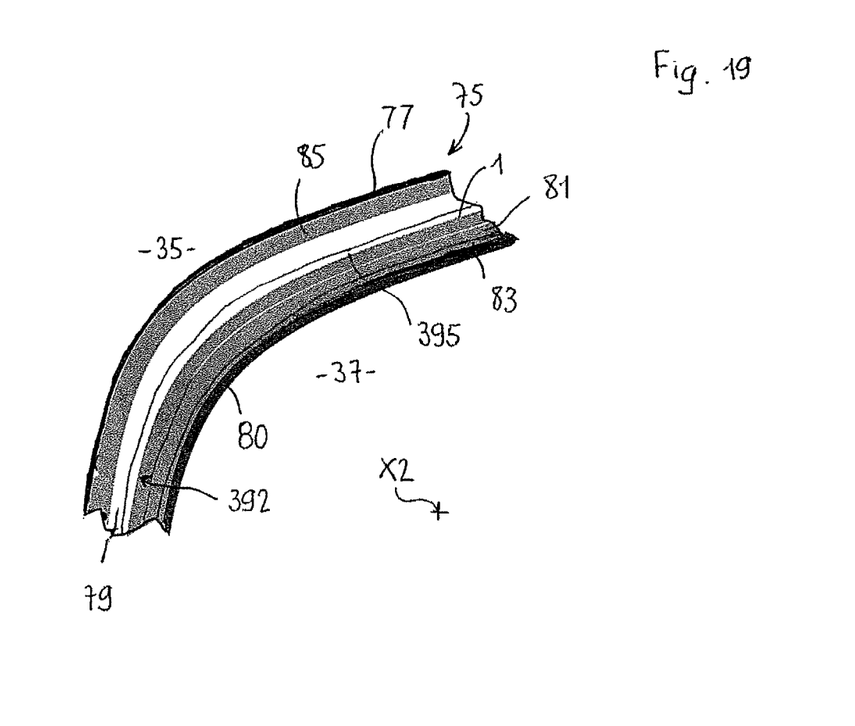
FIG. 19 illustrates in section, as in FIG. 17, the circled area XIX of FIG. 18, which shows a fuselage area at different depths to make the layers that make up the fuselage more visible.

As schematized on these FIGS. 18,19, a fuselage wall 75 (which is a kind of box) comprises successively, in the direction of the thickness, of the external environment 35 towards the interior volume (cabin) 37:
as a structural element mentioned above and, as previously, interposed between the external environment 35 and the internal volume 37 to be protected, sheet metal (forming the external body that may be seen outside the aircraft) 77, typically metallic or composite structural parts with thus, as an internal lining:
a layer of air 79 (of 50 to 150 mm thick; often 60 to 100 mm), then the assembly already presented comprising at least one said inner lining member (395) of the structural element 77, the inner lining member thus comprising (although not illustrated here) at least one said element 1 three-dimensional thermal insulation, under vacuum, the thermal insulation element 1 comprising:
the porous three-dimensional, compressed structure 5, envelope 7 airtightly closed and having a barrier wall 7*a* (and/or 7*b*) thermoformable, and.
a trim lining (or inner lining) 80 (flexible or not) which is internally lining said at least one thermal insulating element 1.

Further, in the direction of thickness, one may also prefer:
that a so-called first layer 81 of thermal (for example a bagged fibrous material) and acoustic insulation material be interposed between the said at least one thermal insulation element 1 and the said trim lining 80 (which forms the "surface" or innermost wall of the fuselage wall 75/the one you see in the passenger compartment (known as the "interior" 37/61), and/or
that a layer of foam 83 be interposed between the so-called first layer 81 and the trim lining 80.

To further strengthen the insulation, a so-called second layer 85 of thermal and acoustic insulation may be interposed between sheets 77 and the air layer 79.

Typical thickness of the sheets 77 is 1.5 to 3 mm; the first and second layers 81,85 are 15 to 30 mm thick.

Apart from the plates 77, at least part of the above-mentioned elements (thus forming the set 75 FIGS. 18-19) may be separated from the plates, in the thickness direction, by frames 89 (including frames 890 for porthole 95) and/or rails 91 and/or stringers 93.

As for the part of the roof 60, following a cutting line parallel to the thickness of the overall fuselage wall 75, this wall has a curved shape (or said bent-shaped form), as illustrated in FIGS. 18-19, or even reliefs and/or depressions, for example at the place (around) portholes 95. Thus, there again, in particular the porous structure 5, which is in three dimensions, is at least bent-shaped, as it was schematized at the place of the tearing off FIG. 19.

(c) Then again (see FIG. 20) is schematized a realization relative again to the insulation of a fuselage 75, but at the place of frames 89; it could however be rails 91, or stringers 93, all fixed (for example by welding) with the plates 77 which cover them.

Figure 20:
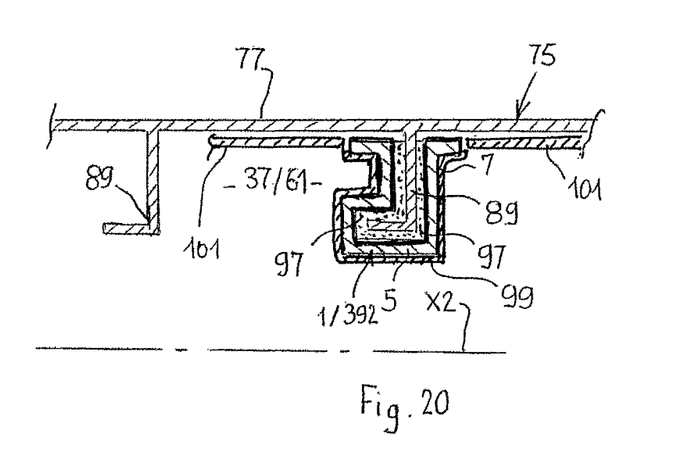
FIG. 20 shows a sectional drawing of yet another application variant.

In a conventional way, the most structuring structures are the stringers 93 which, like the rails 91, extend parallel to the longitudinal axis (aircraft axis) X2. Frames 89 extend circumferentially, around the X2 axis.

In this case, the said "structural element" of the insulation assembly already presented is considered to be the assembly formed by the outer body (defined by the plates 77) and the frames, or the rails or the stringers, fixed with radially inner. As shown in the diagram, the proposed solution is to equip at least part of this assembly by insulating individually the frames in the example, each with an inner lining member comprising at least one said three-dimensional, vacuum thermal insulating element 1, the thermal insulating element 1 always comprising:

the porous three-dimensional, compressed 5 structure,
the envelope 7 closed in an airtight manner and whose barrier wall is thermoformable.

Thermal insulating element 1 may be covered with an aesthetic coating 99 (such as a liner) that may be found in 101 as an inner lining of the outer body/sheet 77.

In the example, the insulated portions (frames 89) protrude radially inward from the sheets 77. Each thermal insulating element 1 extends around the accessible part of the frame concerned. It may be conformed to the shape of the frame because the barrier wall 7a (and/or 7b; not shown) has been thermoformed and the porous structure 5 (idem) is three-dimensional and has been shaped by compression. The two elements 1 and 89 are then engaged one within the other.

The result is a solution that combines efficient insulation, light weight, small dimensions, ease of installation and maintenance.

Between the insulated part (frame 89) considered and the thermal insulation element 1 that extends around it, one may even interpose a layer of traditional insulation 97 (such as glass wool) whose maintenance in place is facilitated/assured by the fixed shape of the thermal insulation element 1, which may be fixed to the said insulated part (frame 89), by gluing or other means.

In terms of fixing or holding, the cohesion between the elements of the roof part 60 or the fuselage structure 75 may for example be ensured by gluing and/or screwing, with the presence of spacers if necessary.

The assembly is made up of two layered structures wrapped or not in a bag 70:
the first one (element 5) is a porous material (density more than 100 to 800 kg/m³) in a vacuum envelope of the PIV type,
the second one (element 50) is a porous material of very (more) low density (from 5 to less than 100 kg/m³) with good thermal insulation properties and good sound absorption properties in high frequencies (above 200 Hz).

The combination of these materials allows a good compromise of thermo-acoustic insulation.

It should be noted that the solution described in connection with FIG. 14, or with the said first and second porous structures claimed, may find an application in the solution of FIGS. 18-20 or its claimed generalization:
cold frame (or equivalent): a low-density insulating element (such as a block, e.g. of glass wool) packed with PIV 5/7 in a 70 fire-rated 70a film envelope (meeting UL94 V0 and/or FAR 25.856 specifications) is attached to frames 89 and/or at least one metal sheet panel 77, to ensure the expected thermo-acoustic properties;

fuselage: an insulating element (e.g. glass wool, corresponding to said second porous structure 50 and comprising a porous material 5a or 5b), assimilable to the first insulation layer 81 packed in PIV 5(5a)/7, in a envelope 70 having a fireproof film 70a, is fixed to the frames, rails, or stringers and/or to at least one metal sheet panel 77 and/or to the trim lining 80, to ensure the expected thermo-acoustic properties;

In the application to the passenger compartment wall as shown in FIGS. 15-17, or its transposition as claimed, the outer envelope 70 having film 70a is optional: the PIV defined by element 5 in its watertight envelope 7 is combined with the insulation formed by the said second porous structure 50 (e.g. glass wool or foam) attached for example to the lateral ends of the roof (mechanical or chemical attachment). The air layer 65 may be established by means of spacers, not shown.

Although not shown, element 1 for the thermal insulation of the solutions shown in connection with FIGS. 15-20 may advantageously be supplemented in such a way that the inner lining member (392 FIGS. 17,19,20) additionally comprises a second porous structure 50 comprising the same porous material 5a, or a different porous material 5b, having a second density, the second density being lower than the first density and the first and second porous structures (5,50) being superimposed, as shown in FIG. 14.

The invention claimed is:
1. An assembly comprising:
a three-dimensional structural element having a curved shape and/or reliefs and depressions, interposed between an external environment and an internal volume to be thermally and/or acoustically protected, and
an inner lining element for lining the three-dimensional structural element, the inner lining element comprising a thermally insulating element which is interposed between the external environment and the internal volume to be protected, the thermal insulating element being bent-shaped and/or having reliefs and depressions, engaged at least partly with respectively the curved shape and/or the depressions and the reliefs of the structural element, in order to substantially follow at least part of a contour thereof,
the thermal insulating element comprising:
a structure made of a three-dimensional porous material,
an envelope closed in an airtight manner,
comprising an airtight barrier wall,
in which envelope is enclosed the three-dimensional porous material whose shape is followed by the airtight barrier wall, and
in which envelope, at outside ambient temperature and pressure, a pressure of between less than $10^5$ Pa and more than $10^{-2}$ Pa prevails,
wherein:
the barrier wall is thermoformable and being thermoformed,
the structure is compressed,
the bent-shaped is defined by a bending of said thermal insulating element, and/or the reliefs and the depressions are defined by embossings and the thermal insulating element, and wherein between two major surfaces of the barrier wall, the structure has thick zones having a first thickness and thin zones having a second thickness lower than the first thickness, the thin zones having a density of the three-dimensional porous material that is higher than a density at the thick zones of the three-dimensional porous material, a minor surface of a wall being a sealing zone where the sheets, or portions of sheets, forming the barrier wall are inter- bonded and sealed together to close the envelope, complementarily, the major surface of the same wall being an area of the envelope bounded by this sealing zone.

2. The assembly according to claim 1, in which:

the three-dimensional porous material is free of chemical binder and has a density between 10 kg/m$^3$ and 300 kg/m$^3$, and the thermal insulating element has at least one zone of attachment where the thermal insulating element is attached to the structural element and where the density of the three-dimensional porous material is higher than at other zones of the three-dimensional porous material.

3. The assembly according to claim 1, in which:

the three-dimensional porous material comprises a chemical binder, and the thermal insulating element has at least one zone of attachment where the thermal insulating element is attached to the structural element and where the density of the three-dimensional porous material is higher than at other zones of the three-dimensional porous material.

4. The assembly according to claim 1, in which the airtight barrier wall is a film having a tensile strength between 10 MPa and 300 MPa.

\* \* \* \* \*